United States Patent [19]

Kozlik et al.

[11] Patent Number: 4,542,420
[45] Date of Patent: Sep. 17, 1985

[54] MANCHESTER DECODER

[75] Inventors: Tony J. Kozlik; Robert L. Spiesman, both of Phoenix, Ariz.

[73] Assignee: Honeywell Inc., Phoenix, Ariz.

[21] Appl. No.: 573,884

[22] Filed: Jan. 24, 1984

[51] Int. Cl.$^4$ .............................................. G11B 5/09
[52] U.S. Cl. ........................................ 360/42; 375/94
[58] Field of Search ...................... 360/42; 375/94, 95; 307/445

[56] References Cited

U.S. PATENT DOCUMENTS

| 3,731,220 | 5/1973 | Besenfelder | 360/42 |
| 3,979,746 | 9/1976 | Jarrett | 360/42 |
| 4,188,620 | 2/1980 | Lamare et al. | 360/42 |
| 4,320,525 | 3/1982 | Woodward | 360/42 |

Primary Examiner—Vincent P. Canney
Attorney, Agent, or Firm—A. A. Sapelli; L. J. Marhoefer; E. W. Hughes

[57] ABSTRACT

A decoder for Manchester encoded data signals in which the encoded data signals are applied to a first circuit which produces a primary pulse at each voltage transition of the applied signals. The primary pulse enables a delay line oscillator which after a predetermined period of delay produces a decode clock signal of a given frequency. The inverted primary pulse, the decode clock signal, and a constant voltage data input signal are applied to a decoder shift register. The primary pulse and selected outputs of the decoder shift register are applied to a logic circuit which produces a receive clock signal having desired low-to-high voltage transitions occurring substantially in the center of each half-bit cell of a Manchester bit cell. The receive clock signal can be applied to a receive data shift register to which the encoded data signals are also applied so that the binary value of each half-bit cell of a Manchester bit cell can be stored in the data shift register.

7 Claims, 2 Drawing Figures

MANCHESTER DECODER

BACKGROUND OF THE INVENTION

1. Field of the Invention

This invention is in the field of decoders for encoded binary signals, and more particularly relates to an improved decoder for Manchester encoded data signals.

2. Description of the Prior Art

Manchester encoded data signals are extensively used in the transmission of digital data. An advantage to this type of encoding is its self-clocking feature, as well as its ability to increase the integrity of the data transmitted by minimizing noise interference, loss of synchronization and undetected transmission errors. There are two general approaches to decoding Manchester encoded data, one such approach uses an integrate-and-dump technique, and the second uses a sequential operation where nonsignificant voltage transitions between Manchester bit cells are masked in generating a strobe, or receive clock signal.

A problem with prior art Manchester decoders is that they do not identify the binary data values represented by the differing voltage levels of each half-bit cell of a Manchester bit cell, which values can be used to increase the integrity of the data transmitted by identifying Manchester bit cells which represent code violations; i.e., Manchester bit cells in which there is no mid-bit voltage transition.

BRIEF SUMMARY OF THE INVENTION

The binary data of a signal representing a Manchester bit cell, which data is transmitted serially, is determined by the direction, or polarity, of the voltage transition, the mid-bit transition, which occurs between the two half-bit cells of a valid Manchester bit cell. Typically, if the voltage level of a Manchester bit cell represents a logic 1 in the first half-bit cell and the voltage level in the second half-bit cell represents a logic 0, then the informational content of the Manchester bit cell is defined as being a logic 1. Concomitantly, if the voltage level in the first half-bit cell represents a logic 0 and that of the second half-bit cell a logic 1, then the informational content of the Manchester bit cell is defined as being a logic 0. If the voltage levels in the two half-bit cells of a given Manchester bit cell are the same; i.e., either both are logic 0's or both are logic 1's, then the informational content of the Manchester bit cell is defined as being a code violation.

The decoder of this invention produces a primary positive pulse having a predetermined pulse width at each voltage transition of the Manchester encoded data signals applied to the decoder. Each primary pulse is applied to a delay line oscillator and enables the oscillator to produce a decode clock signal of a predetermined frequency after a given delay has elapsed after the termination of each primary pulse. The inverted primary pulse is applied to the clear, or master reset, terminal of a decoder shift register, and the decode clock signal from the delay line oscillator is connected to the clock terminal of the decoder shift register. The data input terminals of the decoder shift register are both connected to the same source of constant voltage, Vcc in the preferred embodiment, a voltage level defined as being high, or a logic 1. The primary pulse and selected outputs of the decoder shift register are connected to a logic circuit to produce a receive clock signal having an appropriate voltage transition substantially in the center of each half-bit cell of each Manchester bit cell of the applied data signals. The receive clock can then be used to clock voltage levels of the applied data signals, or data into a receive data shift register with the logical value of each half-bit cell of each of eight Manchester bit cells, for example, being stored in the data shift register.

It is, therefore, an object of this invention to provide an improved Manchester decoder which produces a receive clock signal substantially in the center of each half-bit cell of each Manchester bit cell of a Manchester encoded data signal.

It is another object of this invention to produce a Manchester decoder, the receive clock signal of which is synchronized with each voltage transition of the encoded data signals.

It is yet another object of this invention to provide a more reliable and less expensive improved Manchester decoder.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DETAILED DESCRIPTION OF THE INVENTION

Figure 1:
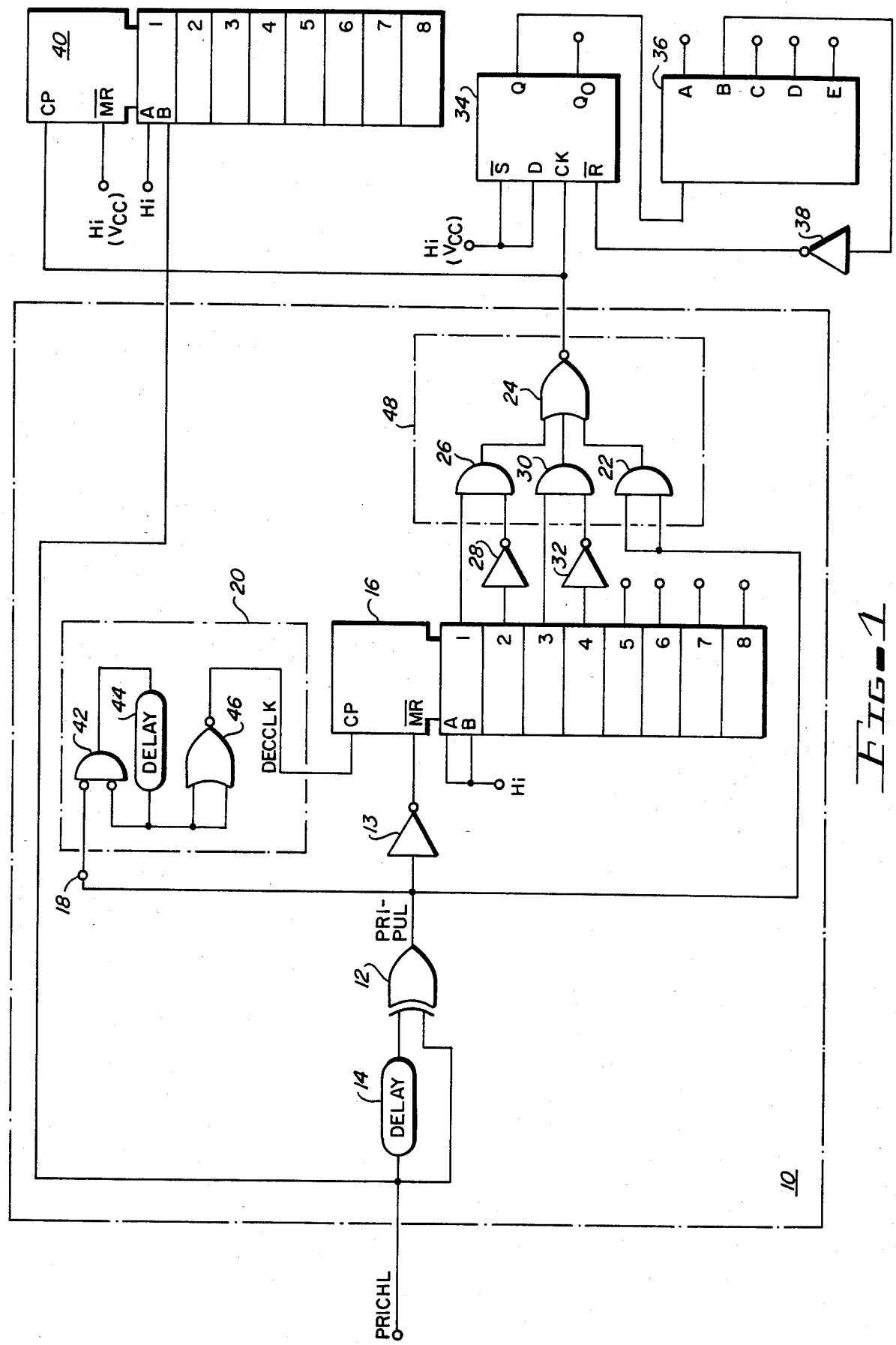
FIG. 1 is a schematic block diagram of the Manchester decoder of this invention.
Figure 2:
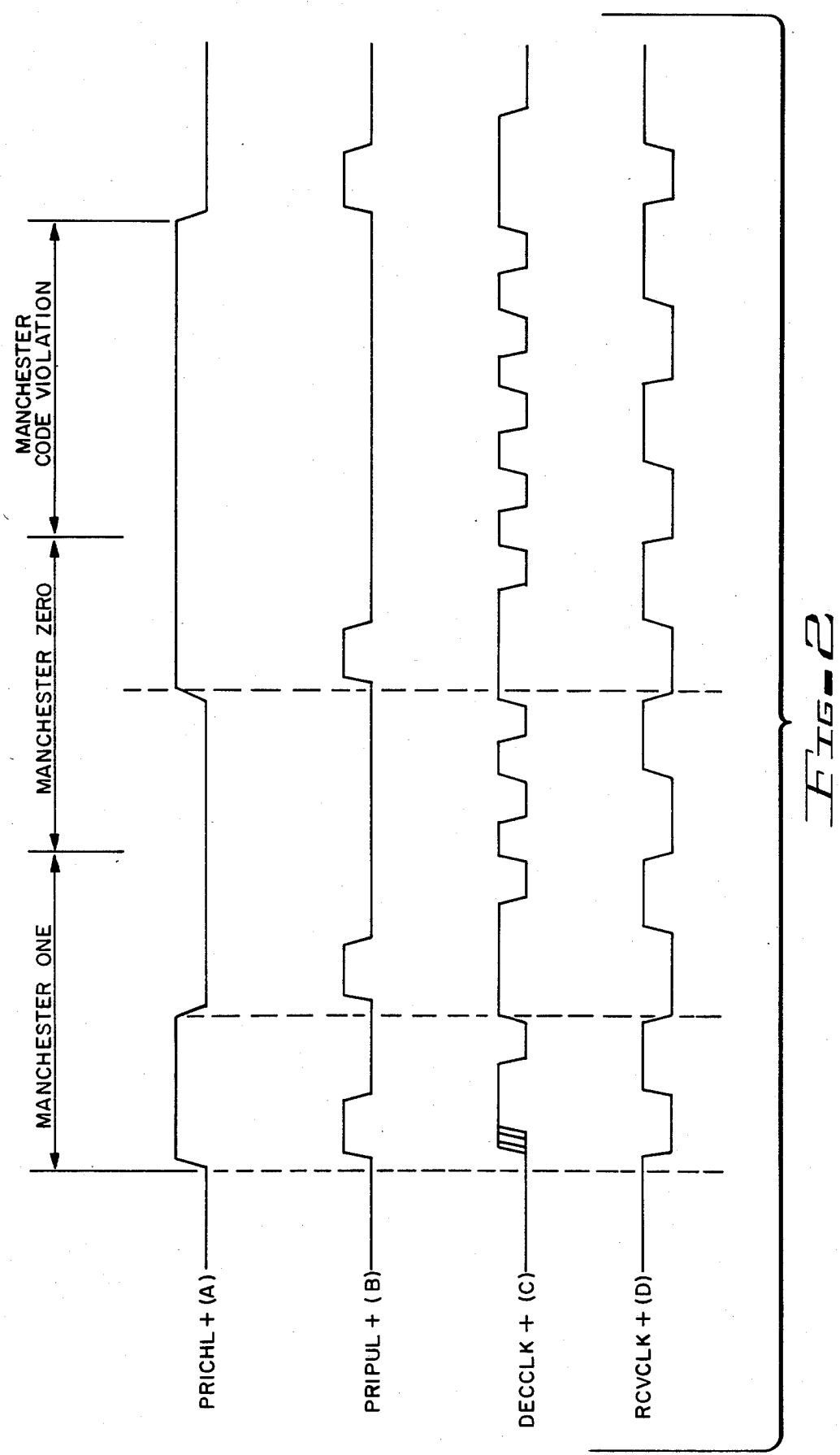
FIG. 2 (A-D) illustrates typical wave forms useful in describing the operation of this invention.

In FIG. 1, Manchester decoder, or receive clock derivation circuit, 10 has applied to it Manchester encoded data signals identified as PRICHL. In FIG. 2A, a Manchester bit cell having the value of a logical one, denoted Manchester One; a second such bit cell having the value of a logical zero, denoted Manchester Zero; and a Manchester bit cell which does not comply with the requirements for Manchester encoded data denoted a Manchester Code Violation are illustrated. A requirement of Manchester encoded data signals is that each valid Manchester bit cell have a voltage transition substantially in the middle of each such bit cell. This mid-bit voltage transition, which can be either positive going or negative going, divides each Manchester bit cell into two half-bit cells. A voltage transition of a given polarity or direction thus occurs substantially in the center, or middle, of each Manchester bit cell. In FIG. 1, Manchester encoded data signals to be decoded by decoder 10 are identified as PRICHL, an abbreviation for primary channel. In the modules of a local-area network in which the decoder of this invention is used, the encoded data signals are transmitted over two coaxial cables in parallel, with one such cable being designated as the primary channel, the channel of the dual redundant networks communication medium which is being utilized by the module at any given time to receive Manchester encoded signals. The received data on the primary channel, PRICHL, is applied directly to one input terminal of EXCLUSIVE-OR gate 12 and by fixed delay circuit 14 to the other input terminal of gate 12. The output of gate 12, designated as primary pulse, PRIPUL, is a positive going signal, and is illustrated in FIG. 2B. One such pulse is produced for each voltage transition of the received Manchester encoded data signals PRICHL. The pulse width of a primary pulse signal is determined by the magnitude of the delay provided by fixed delay 14. The output of EXCLUSIVE-OR gate 12 is applied through inverter 13 to the master reset terminal $\overline{MR}$ of serial in, parallel out, decoder shift register 16 which forces all the outputs of register 16 low. The primary pulse produced by gate 12 is also applied to the enable terminal 18 of delay line oscillator 20. The primary pulse disables oscillator 20 while high or positive and the output of oscillator 20 goes high. The output signal of delay line oscillator 20 is the DECCLK signal, wave forms of which are illustrated in FIG. 2C. The output of EXCLUSIVE-OR gate 12 is also applied to both input terminals of two input AND gate 22, the output of which is one input of NOR gate 24. The falling edge of a PRIPUL will produce a rising edge or positive voltage transition at the output of NOR gate 24, the output of which is the receive clock signal RCVCLK. Illustrative wave forms of the RCVCLK signal are illustrated in FIG. 2D. It should be noted that the rising edge, or positive transition, of a receive clock pulse, RCVCLK, is substantially in the center of the first half-bit cell of each Manchester bit cell; provided, of course, that the magnitude of the fixed delay provided by delay circuit 14 has the proper value.

After a primary pulse has been produced by gate 12, the output of the delay line oscillator 20 goes low after a predetermined delay determined by fixed delay 44. Delay line oscillator 20 will continue to produce a square wave output at approximately four times the frequency of the received data PRICHL until another transition in the received data PRICHL occurs. The output of delay line oscillator 20, DECCLK, is applied to the clock input terminal CP of decoder shift register 16. Each low-to-high voltage transition of DECCLK will shift a logical one through decoder shift register 16 because the two data input terminals A and B of decoder shift register 16 are connected to a high voltage source Vcc representing a logical one. Output terminal 1 of decoder shift register 16 is directly connected to one input terminal of AND gate 26, while output terminal 2 is connected through inverter 28 to the second input terminal of AND gate 26. Gate 3 of decoder shift register 16 is directly connected to one input terminal of AND gate 30 while output 4 is connected through inverter 32 to the second input terminal of AND gate 30. The output of AND gate 26 is connected to one input of NOR gate 24 and, similarly, the output of AND gate 30 is connected to yet another terminal of NOR gate 24. Thus, a negative going receive clock voltage transition, RCVCLK, will be produced when a logical one is shifted into output 1 and again when a logical one is shifted into output 3 of decoder shift register 16. A positive going voltage transition in the RCVCLK signal produced by NOR gate 24 will occur substantially in the middle of each half-bit cell of each Manchester cell, as illustrated in FIGS. 2A and 2D, when delays 14 and 42 have the proper values.

A receive clock signal, RCVCLK, generated when a logic 1 is shifted into output 3 of decoder shift register 16, can only be the result of a Manchester code violation; i.e., no voltage transition has occurred between half-bit cells of a Manchester bit cell to disable clock 20.

The receive clock signal, RCVCLK, produced by NOR gate 24 is applied to the clock terminal CK of D flip-flop 34. The Q output of flip-flop 34 is applied to tapped delay line 36, one of the outputs of which is inverted by inverter 38 and applied to the reset terminal $\overline{R}$ of flip-flop 34 to control the width of the pulses RCVCLK (A–E) produced by delay line 36, with each RCVCLK (A–E) being delayed approximately 10 nanoseconds with respect to its predecessor.

The receive clock signal, RCVCLK, from NOR gate 24 can also be applied to the clock terminal CP of data shift register 40, a serial in, parallel out, shift register. The Manchester encoded data signals PRICHL can also be applied to one data input terminal B, for example, of data shift register 40 and the other terminal can be connected to a source of high voltage representing a logic one which would be anded with the received signal PRICHL. The master reset terminal $\overline{MR}$ of register 40 is also connected to the source of high voltage Vcc, a logic one. As a result, a sample of the voltage level of each half-bit cell of a Manchester bit cell can be taken, sampled, or stored into shift register 40 with the sample being taken substantially from the middle, or center, of each half-bit cell of a Manchester bit cell. The logic value of the data for the first half-bit cell of each Manchester bit cell can be used as, or represents, the informational content of each Manchester bit cell in NRZ form. The logic values, represented by each half-bit cell of each Manchester bit cell, can be used to detect a code violation when and if it occurs.

The delay line oscillator 20 can be produced using a conventional AND gate 42 with inverted inputs, a delay circuit 44, and a NOR circuit 46, as illustrated in FIG. 1. The logic circuit 48 which includes AND gates 22, 26 and 30, and NOR gate 24 produces the RCVCLK signals from the primary pulse PRIPUL and selected outputs of decoder shift register 16, some of which are inverted. The signals RCVCLK (A–E) produced by tapped delay line 36 can be used to compensate for circuit delays of logic circuits that operate on the decoded Manchester data.

In the preferred embodiment, the shift registers 16 and 40 are model F164's. The EXCLUSIVE-OR gate 12 is an F86, flip-flop 34 is an F74, and gates 22, 24, 26 and 30 in an F64 and the inverters 28, 32 and 38 are F04's, circuits which are commercially available from Fairchild Camera and Instrument Corporation, South Portland, Maine 04106.

From the foregoing, it is apparent that the Manchester decoder of this invention will produce a receive clock signal having the desired type or polarity of voltage transition substantially in the center of each half-bit cell of the Manchester cell, which receive clock signal is resynchronized with each voltage transition of the encoded data signals to provide a more reliable Manchester decoder.

While the invention has been described with reference to illustrated embodiments, the description is for illustrative purposes and is not to be construed as limiting the scope of the invention. Various modifications and changes may occur to those skilled in the art without departing from the true spirit and scope of the invention as defined by the claims hereof.

What is claimed is:

1. A decoder for Manchester encoded data signals, the binary data of which is included in Manchester bit cells with each Manchester bit cell being divided into two half-bit cells, the binary data of the cell being determined by the voltage level transition occurring between two half-bit cells, comprising:

an EXCLUSIVE-OR gate for producing a primary pulse, said EXCLUSIVE-OR gate having two input terminals;

circuit means for applying the data signals directly to one input terminal of the EXCLUSIVE-OR GATE MEANS;

circuit means including a delay circuit for applying the data signals to the other input of the EXCLUSIVE-OR gate means;

a delay line oscillator means having an enable terminal for producing a square wave decode clock signal when enabled;

circuit means for applying the output of the EXCLUSIVE-OR gate to the enable terminal of the delay line oscillator;

a decoder shift register having a clock input terminal, a master reset input terminal, and "n" output terminals where "n" is an integer other than zero;

inverter circuit means for applying the output of the EXCLUSIVE-OR gate means to the master reset input terminal of the decoder shift register;

circuit means for applying the square wave decode clock signal produced by the delay line oscillator to the clock terminal of the decoder shift register;

logic circuit means to which the primary pulse and selected ones of the output terminals of the decoder shift register are applied for producing a receive clock signal, said receive clock signal having a voltage transition of one type substantially in the center of each half-bit cell of the data signal;

a receive data serial in parallel out shift register having a clock input terminal and a data input terminal;

circuit means for applying the data signals to the data input terminal of the receive data shift register; and circuit means for applying the receive clock signal to the clock terminal of the receive data shift register to shift the voltage levels of each half-bit cell of a Manchester bit cell into the receive data shift register with the voltage level so shifted being substantially from the middle of each half-bit cell of a Manchester bit cell.

2. A decoder as defined in claim 1 in which "n" equals 8.

3. A decoder as defined in claim 2 in which output terminals 1 through 4 are the selected output terminals of the decoder shift register.

4. A decoder as defined in claim 3 in which the outputs of output terminals two and four are inverted before being applied to said logic circuit means.

5. A decoder as defined in claim 4 in which the frequency of the receive clock signal is substantially four times that of the encoded data signals.

6. A decoder as defined in claim 5 in which the voltage transition of one type is a low-to-high voltage transition.

7. A receive clock derivation circuit for producing a receive clock signal for decoding Manchester encoded data signals, the binary data of said signals being organized into Manchester bit cells with each such Manchester bit cell having a given period, each such Manchester bit cell being divided into half-bit cells with the data content of each Manchester bit cell being determined by the type of voltage transition occurring between the two half-bit cells of the Manchester cell, comprising:

first means to which the data signals are applied for producing a primary pulse having a predetermined pulse width at each voltage transition of the encoded data signals;

delay line oscillator means responsive to the production of each primary pulse for producing a substantially square decode clock signal beginning a predetermined period of time after each primary pulse; and second means responsive to each primary pulse and the decode clock signals for producing a receive clock signal having a voltage transition of one polarity substantially in the center of each half-bit cell.

* * * * *